United States Patent
Dennis et al.

(10) Patent No.: US 9,562,580 B1
(45) Date of Patent: Feb. 7, 2017

(54) CALIPER BRAKE HAVING SPRING APPLIED, HYDRAULICALLY RELEASED ASSEMBLY AND PRESSURE INTENSIFYING ASSEMBLY

(71) Applicant: Ausco Products, Inc., Benton Harbor, MI (US)

(72) Inventors: Brian P. Dennis, Kalamazoo, MI (US); Howard H. Baldeosingh, Stevensville, MI (US); Edward L. Chandler, St. Joseph, MI (US)

(73) Assignee: Ausco Products, Inc., Benton Harbor, MI (US)

( * ) Notice: Subject to any disclaimer, the term of this patent is extended or adjusted under 35 U.S.C. 154(b) by 0 days.

(21) Appl. No.: 14/816,155

(22) Filed: Aug. 3, 2015

(51) Int. Cl.
| | |
|---|---|
| F16D 65/18 | (2006.01) |
| F16D 55/225 | (2006.01) |
| F16D 121/14 | (2012.01) |
| F16D 121/04 | (2012.01) |
| F16D 125/58 | (2012.01) |

(52) U.S. Cl.
CPC ............. *F16D 65/18* (2013.01); *F16D 55/225* (2013.01); *F16D 2121/04* (2013.01); *F16D 2121/14* (2013.01); *F16D 2125/582* (2013.01)

(58) Field of Classification Search
CPC .. F16D 65/18; F16D 2121/02; F16D 2121/12; F16D 2125/10; F16D 55/226; F16D 55/225; F16D 2121/04; F16D 2121/14; B60T 17/226; B60T 8/52
USPC ................................ 188/170, 72.4, 71.9, 72.3
See application file for complete search history.

(56) References Cited

U.S. PATENT DOCUMENTS

| | | | | |
|---|---|---|---|---|
| 3,651,900 | A * | 3/1972 | Feikema | B60T 8/52 188/181 T |
| 3,893,549 | A * | 7/1975 | Bennett | B60T 17/22 188/170 |
| 4,257,496 | A * | 3/1981 | Fujita | F16D 55/224 188/344 |
| 5,076,401 | A * | 12/1991 | Ta | B60T 13/22 188/170 |
| 5,150,772 | A * | 9/1992 | Pantale | B60T 8/26 188/195 |
| 7,434,669 | B2 * | 10/2008 | Halasy-Wimmer | F16D 65/18 188/158 |
| 8,127,897 | B2 * | 3/2012 | Baldeosingh | F16D 59/02 188/106 F |
| 8,360,215 | B2 * | 1/2013 | Chandler | F16D 65/28 188/317 |

(Continued)

*Primary Examiner* — Thomas J Williams
*Assistant Examiner* — Mariano Sy
(74) *Attorney, Agent, or Firm* — Renner, Kenner, Greive, Bobak, Taylor & Weber

(57) ABSTRACT

A caliper brake (10) is adapted to act upon a stator (40) to engage a rotor of a vehicle. A housing (11) carries both a spring applied hydraulically released piston assembly (12) and a pressure intensifying piston assembly (14). The assemblies (12, 14) are in fluid communication with each other. The assembly (12) includes a piston (18) and a spring assembly (20) which urges the piston (18) into a first position engaging the stator (40). The piston assembly (14) includes a pressure intensifying (PI) piston (64) which is in a first position when the piston (18) is in the first position. When the PI piston (64) moves from a first position to a second position, the fluid acts upon the piston (18) thereby disengaging the piston (18) from the stator (40).

13 Claims, 6 Drawing Sheets

(56) References Cited

U.S. PATENT DOCUMENTS

| | | | |
|---|---|---|---|
| 8,490,758 B2* | 7/2013 | Ollat | B60T 13/588 188/1.11 E |
| 2007/0163849 A1* | 7/2007 | Knop | F16D 65/18 188/106 P |
| 2012/0325599 A1* | 12/2012 | Pozivilko | F16D 55/2265 188/73.31 |

* cited by examiner

CALIPER BRAKE HAVING SPRING APPLIED, HYDRAULICALLY RELEASED ASSEMBLY AND PRESSURE INTENSIFYING ASSEMBLY

TECHNICAL FIELD

This invention relates to a caliper brake. More particularly, this invention relates to a caliper brake that includes a spring applied, hydraulically released assembly and a pressure intensifying assembly.

BACKGROUND

Rough terrain vehicles, such as cranes, are known to use spring applied, hydraulically released caliper brakes as a parking brake. These caliper brakes generally require the use of hydraulic fluid to create hydraulic pressure in order to release the brake.

The source of this hydraulic pressure is usually from vehicle hydraulics, since rough terrain vehicles generally include a hydraulic system. However, these vehicles tend to only have low pressure hydraulic circuits available in the area of the vehicle where these caliper brake are located.

One previous solution to this problem is the use of a very large piston with low pressure behind the piston. Since the piston is large, the area that pressure acts against is large, and the piston can generate enough force to overcome the springs. However, this is often not a viable option due to cost of materials and space constraints on the vehicle.

Another prior art solution is to use an external hydraulic assembly that acts on a mechanical device. This goal of such a device is to give the external assembly a mechanical advantage over the springs. But hydraulic assemblies used in this manner are prone to leakage and contamination as a linkage rod thereof generally has to move in three planes. This multi planar movement makes it difficult to effectively seal the rod which ineffective seal leads to corrosion, seal wear, and seal failures.

Thus, there is a need for an improved caliper brake that offers one or more improvements over the prior art.

DISCLOSURE OF THE INVENTION

It is thus an object of one aspect of the present invention to provide a caliper brake with a spring applied, hydraulically released assembly and a pressure intensifying assembly in the brake housing.

It is an object of another aspect of the present invention to provide a caliper brake, as above, where the spring applied, hydraulically released assembly can be released by using a low pressure hydraulic circuit.

It is an object of a further aspect of the present invention to provide a caliper brake, as above, that alleviates the risks of leakage, contamination, and corrosion.

It is an object of an additional aspect of the present invention to provide a caliper brake, as above, having a smaller overall size so as to more easily fit within a vehicle.

These and other objects of the present invention, as well as the advantages thereof over existing prior art forms, which will become apparent from the description to follow, are accomplished by the improvements hereinafter described and claimed.

In general, a caliper brake according to the concepts of the present invention is adapted to act upon a stator to engage a rotor of a vehicle. The brake includes a housing carrying a first piston assembly and a second piston assembly in fluid communication with the first piston assembly. The first piston assembly includes a first piston and a spring assembly which urges the first piston into a first position engaging the stator. The second piston assembly includes a second piston positionable in a first position when the first piston is in the first position. When the second piston moves from the first position to a second position, the fluid acts upon the first piston to disengage the first piston from the stator.

In accordance with another aspect of the invention, a caliper brake is adapted to act upon a stator to engage the rotor of a vehicle. The brake includes a first piston assembly in fluid communication with a second piston assembly. The first piston assembly includes a first piston and a spring assembly which urges the first piston into a first position engaging the stator. The second piston assembly includes a second piston positionable in a first position when the first piston is in the first position. The second piston has a bore therethrough in fluid communication with the first piston. The bore receives a source of fluid. A valve is positioned in the bore and it moves from a position wherein the bore is open to the source of fluid to a position closing the bore as the second piston moves from the first position to the second position such that the fluid acts upon the first piston thereby disengaging the first piston from the stator.

The invention also includes a method of moving a piston in a housing of a brake away from engagement with a stator including the steps of providing a second piston in the housing in fluid communication with the piston, and moving the second piston to provide a fluid force on the piston to move the piston away from the stator.

A preferred exemplary caliper brake according to the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
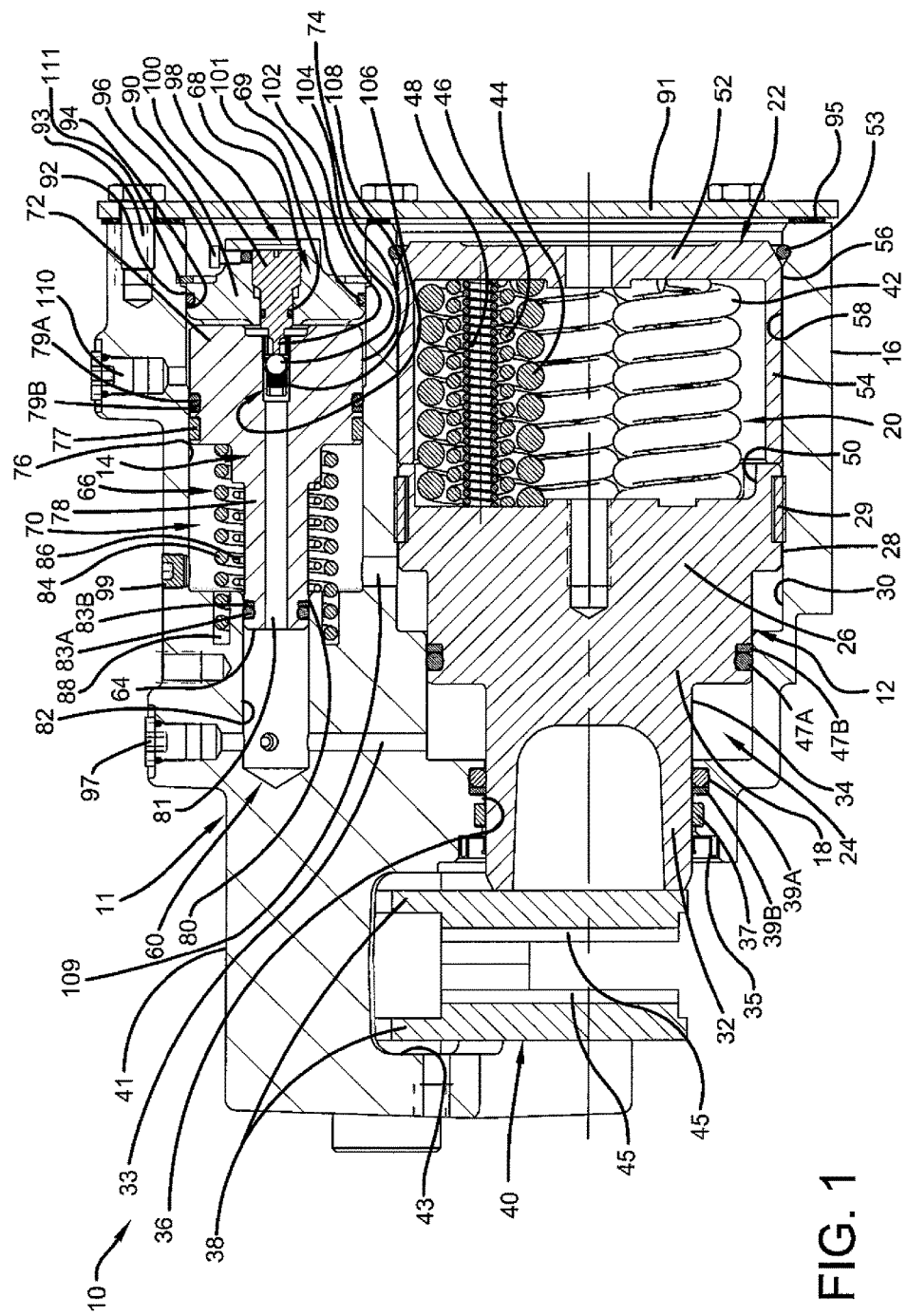
FIG. 1 is a sectional view of a caliper brake according to the concepts of the present invention taken substantially along line 1-1 of FIG. 5.

A caliper brake according to the concepts of the present invention is generally indicated by the numeral 10. Caliper brake 10 includes a housing, generally indicated by the numeral 11, that carries and protects components of brake 10 and locates it in operative relation to a conventional wheel rotor. Housing 11 includes a spring applied, hydraulically released (SAHR) assembly, generally indicated by the numeral 12, and a pressure intensifying (PI) assembly, generally indicated by the numeral 14.

SAHR assembly 12 is positioned at a piston assembly end 16 of housing 11 and includes an SAHR piston 18, a spring assembly, generally indicated by the numeral 20, and an end cap, generally indicated by the numeral 22. SAHR piston 18 is a cup-shaped piston that moves within a stepped bore, generally indicated by the numeral 24, in housing 11. Piston 18 has a body portion 26 having an outer cylindrical surface 28 that engages the maximum diameter chamber 30 in stepped bore 24. Outer cylindrical surface 28 may include a wear ring 29 to allow a small clearance between outer cylindrical surface 28 and bore 24 without causing wear of either surface. This also prevents binding of piston 18 by providing better support over a longer portion of piston 18.

Piston 18 further includes a projecting flange 32 with a reduced diameter cylindrical surface 34 that operates in a reduced diameter chamber 36 in stepped bore 24. In the "default" position, projecting flange 32 engages the proximate or inboard stator plate 38 of a stator assembly, generally indicated by the numeral 40. Proximate to reduced diameter cylindrical surface 34, housing 11 can include one or more of an oil seal 35, a wear ring 37, and a combination O-ring 39A and backup ring 39B. When present, oil seal 35 serves to preclude entry of foreign matter into reduced diameter chamber 36, wear ring 37 serves to provide clearance similar to as described above, and the combination O-ring 39A and backup ring 39b help to control the escape of fluid from fluid chamber 33. Piston 18 can also include a combination O-ring 47A and backup ring 47B.

In the "default" position of piston 18 the stator assembly 40 is engaged. Stator assembly 40 is located in a stator assembly end 41 of housing 11 having a cavity 43 adapted to enclose a portion of the rotor (not shown). Cavity 43 also receives a portion of stator assembly 40. In particular, a pair of stator plates 38 are positioned within cavity 43 displaced axially to either side of the rotor so that a portion of the rotor is interposed therebetween. Stator plates 38 are positioned to substantially parallel the rotor and carry one or more pads 45 for engaging the rotor. Pads 45 may be fabricated of any of numerous friction materials known in the art. Each stator plate 38 can optionally have projecting ears at the longitudinal ends thereof having bores therein for receiving stator pins on which the stator plates are freely slidably mounted.

SAHR piston 18 of SAHR assembly 12 is urged into engagement with stator assembly 40 by spring assembly 20. Depending upon the force required to be imparted to the rotor by SAHR piston 18, spring assembly 20 may include one or more coil springs. As shown, there are five spring stacks 42 circumferentially positioned within the piston diameter, with each stack 42 having three springs, namely outer spring 44, intermediate spring 46, and inner spring 48, of differing diameters and preferably being positioned on a common central axis. Therefore, SAHR assembly 12 includes fifteen spring elements in the embodiment shown. In order to stabilize spring stacks 42, SAHR piston 18 is provided with one or more axial recesses 50 capable of fitting one or more of the spring stacks 42. In one or more embodiments, an axial recess 50 is sized to receive an outer spring 44.

Spring stacks 42 and springs 44, 46, 48 are restrained opposite SAHR piston 18 by end cap 22. End cap 22 has a cylindrical body 52 that telescopes into stepped bore 24 with an annular projecting rim 54 that receives at least a portion of spring stacks 42. At least a portion of the outer surface of rim 54 engages at least a portion of surface 58 in stepped bore 24.

The position of the end of spring stacks 42 opposite SAHR piston 18 may be optionally provided with one or more shims (not shown) to act as a slip plane to reduce resistance to rotation of end cap 22 relative to spring stacks 42. End cap 22 may have a C-ring 53 positioned near an axial end thereof to keep end cap 22 from pushing out of the back of the stepped bore 24.

With the "default" position being that SAHR piston 18 is urged into engagement with stator assembly 40 by spring assembly 20, the spring force of spring assembly 20 must be selectively overcome in order to move SAHR piston 18 to an unactuated position to release the rotor. To accomplish this, a hydraulic fluid supply network, generally indicated by the numeral 60, provides pressurized fluid to fluid chamber 33.

By way of fluid chamber 33, SAHR assembly 12 can be said to be in fluid communication with PI assembly 14. PI assembly 14 is also positioned at the piston assembly end 16 of housing 11 and is positioned laterally of SAHR assembly 12. PI assembly includes a PI piston 64, a spring assembly, generally indicated by the numeral 66, and an end cap, generally indicated by the numeral 68. PI piston 64 moves within a stepped bore, generally indicated by the numeral 70, in housing 11. Piston 64 has a body portion 72 having an outer cylindrical surface 74 that engages a portion of the chamber in stepped bore 70. The chamber in stepped bore 70 includes a maximum diameter chamber 76, where the diameter of outer cylindrical surface 74 is slightly less than the diameter of maximum diameter chamber 76. Outer cylindrical surface 74 may include one or more of a wear ring 77 and a combination O-ring 79A and backup ring 79B. When present, these components serve similar functions as to those described above.

PI Piston 64 further includes a projecting flange 78 with a reduced diameter cylindrical surface 80 that operates in a reduced diameter chamber 82 in stepped bore 70 to fluidly engage the portion of fluid chamber 33 fluidly between SAHR piston 18 and PI piston 64. PI piston 64 further includes a bore 81 axially therethrough. Reduced diameter cylindrical surface 80 can include a combination O-ring 83A and backup ring 83B. When present, these components serve similar functions as to those described above.

PI piston 64 of PI assembly 14 is urged toward end cap 68 by spring assembly 66. Depending upon the force required to be fluidly imparted to SAHR piston 18 by PI piston 64, spring assembly 66 may be provided with one or more coil springs. As shown, there is one spring stack circumferentially positioned within the piston diameter, with the stack having two springs, namely outer spring 84 and inner spring 86 of differing diameters and preferably being positioned on a common central axis. Housing 11 is provided with an axial recess 88 which is sized to receive springs 84, 86. Recess 88 is used to achieve the correct force yielded by springs 84, 86. Without recess 88, springs 84, 86 could be overstressed.

PI piston 64 is restrained opposite spring assembly 66 by end cap 68. End cap 68 has a cylindrical body 90 that telescopes into stepped bore 70. End cap 68 is held into position by a retaining ring 111. At least a portion of the outer cylindrical surface 92 of end cap 68 can engage at least a portion of the inner chamber 94 of stepped bore 70.

End cap 68 and end cap 22 are proximately positioned to housing end plate 91. End plate 91 closes housing 11 outwardly of end caps 22, 68 and is essentially a flat cover held in place by a plurality of hex bolts 93 extending through bores in end plate 91 and into housing 11. A gasket 95 may be used for sealing between end plate 91 and housing 11. Housing 11 may also include a bleeder port and a plug 97, for purging air from hydraulic fluid supply network 60. Housing 11 may also include a pipe plug 99 and a passage 109. Passage 109 is provided to allow communication, as in air or gas communication, between bore 24 and bore 70. Passage 109 prevents air or gas from being trapped in one bore or the other. Pipe plug 99 can serve to fill a hole that may be created in the manufacture of passage 109. To machine passage 109, a drill can be used from the outside of housing 11, thus creating the hole filled by pipe plug 99. Pipe plug 99 can also prevent contaminants from entering housing 11.

End cap 68 includes a pin, generally indicated by the numeral 98, positioned axially therethrough. Pin 98 includes an elongated body 100 telescoping through body 90. Pin 98 can be secured in place by a set screw 96 threaded into body 90. A tip 102 extends from elongated body 100 for engaging a ball 104 of a ball valve, generally indicated by the numerally 106. Ball valve 106 further includes a spring 108 that engages ball 104. Elongated body 100 can have an O-ring 101 positioned therearound. One or more aspects of ball valve 106 may be further described by the disclosure in U.S. Pat. No. 8,360,215, which is incorporated herein by reference.

Figure 2:
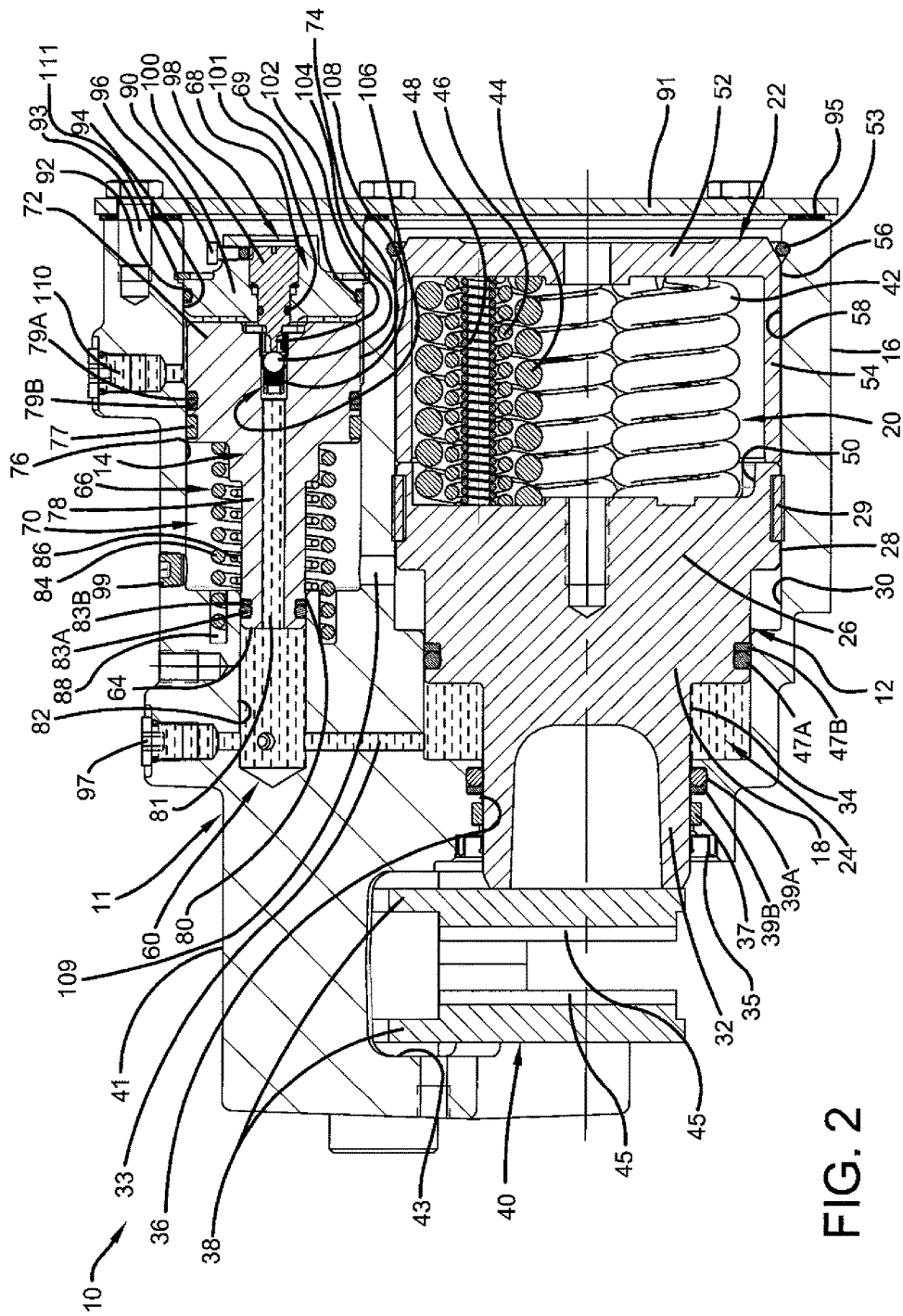
FIG. 2 is a sectional view similar to FIG. 1 but with the hydraulic fluid being shown.

The "default" position of PI piston 64 is as shown in FIG. 1. Tip 102 engages ball 104 and overcomes the spring force of spring 108. In this position, in can be said that ball 104 is unseated. With ball 104 in an unseated position, hydraulic fluid enters through hydraulic port 110. Since ball 104 is unseated, hydraulic fluid then passes through ball valve 106 and through bore 81. Then, hydraulic fluid enters into the portion of fluid chamber 33 between SAHR piston 18 and PI piston 64. FIG. 2 is representative of the state when hydraulic fluid has completely filled fluid chamber 33 of hydraulic fluid supply network 62.

Figure 3:
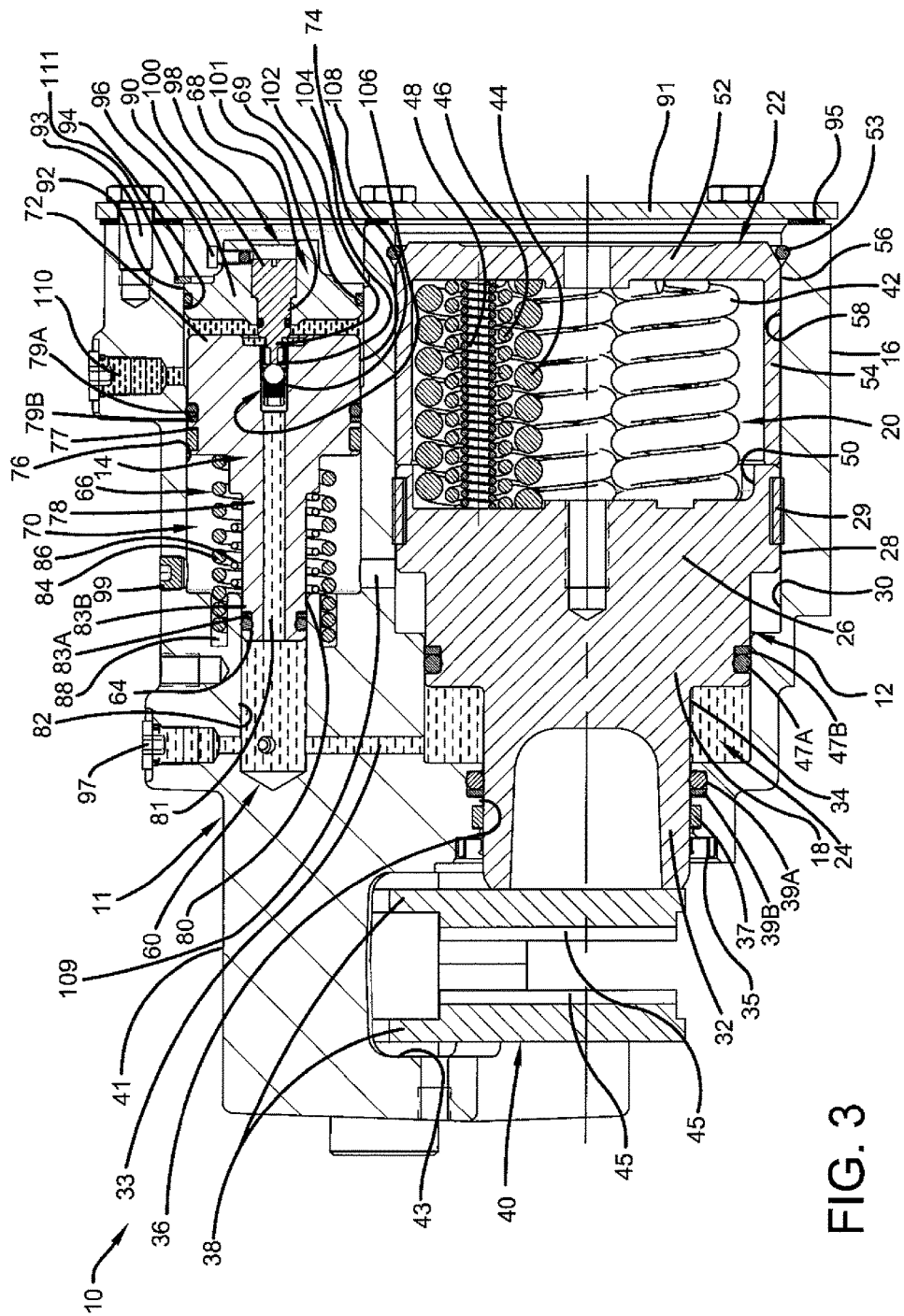
FIG. 3 is a view similar to FIG. 1 showing when pressure has increased behind the pressure intensifying piston and the pressure intensifying piston has begun movement.

In this state, the pressure of the hydraulic fluid behind PI piston 64 is not yet sufficient to overcome the spring force of spring assembly 66. As hydraulic fluid continues to enter through hydraulic port 110, the pressure continues to build. Since the surface area of the large end of PI piston 64 is greater than the surface area of the smaller end of PI piston 64, more force is acting on the large end than on the smaller end. Once the force applied to the large end is greater than the sum of the spring force and the force applied to the smaller end, PI piston 64 begins to travel into bore 70. This movement is represented in FIG. 3.

Figure 4:
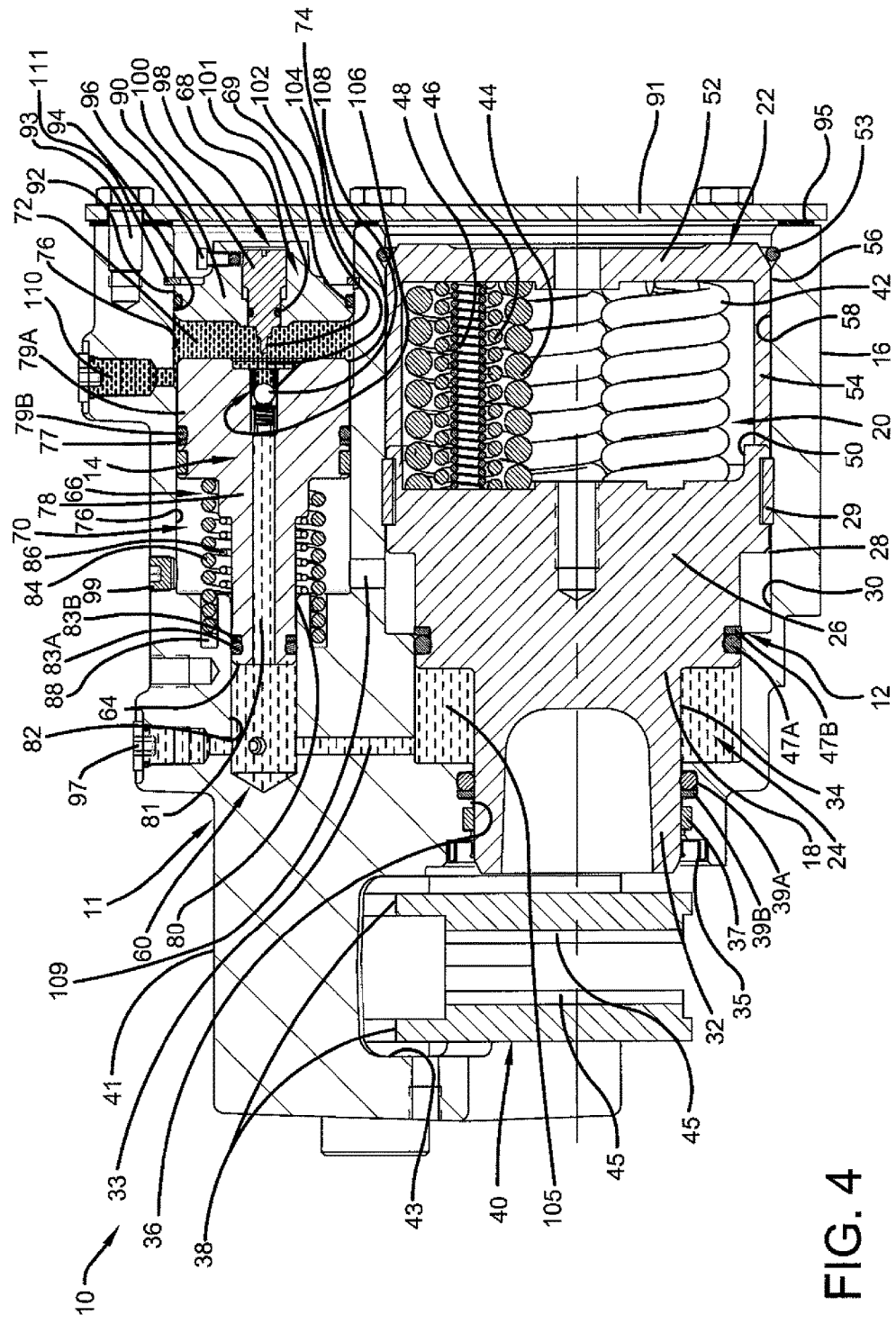
FIG. 4 is a view similar to FIG. 3 but showing when pressure has further increased behind the pressure intensifying piston, thereby further increasing the pressure in front of the pressure intensifying piston, to further move the pressure intensifying piston, thereby moving the spring applied, hydraulically released piston.
Figure 5:
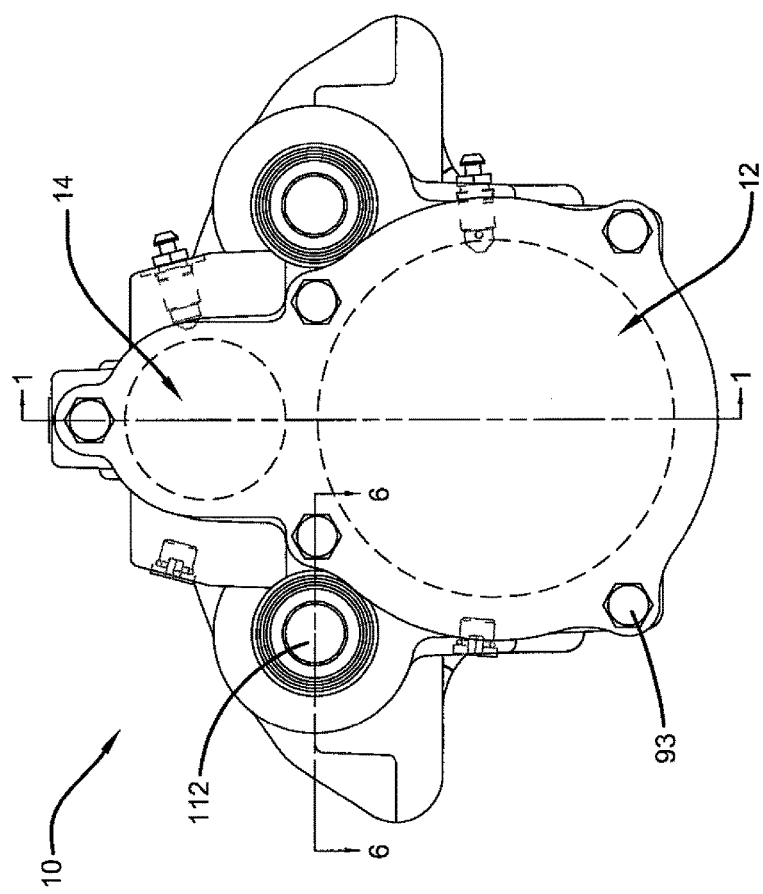
FIG. 5 is a front elevational view of a caliper brake according to the concepts of the present invention.
Figure 6:
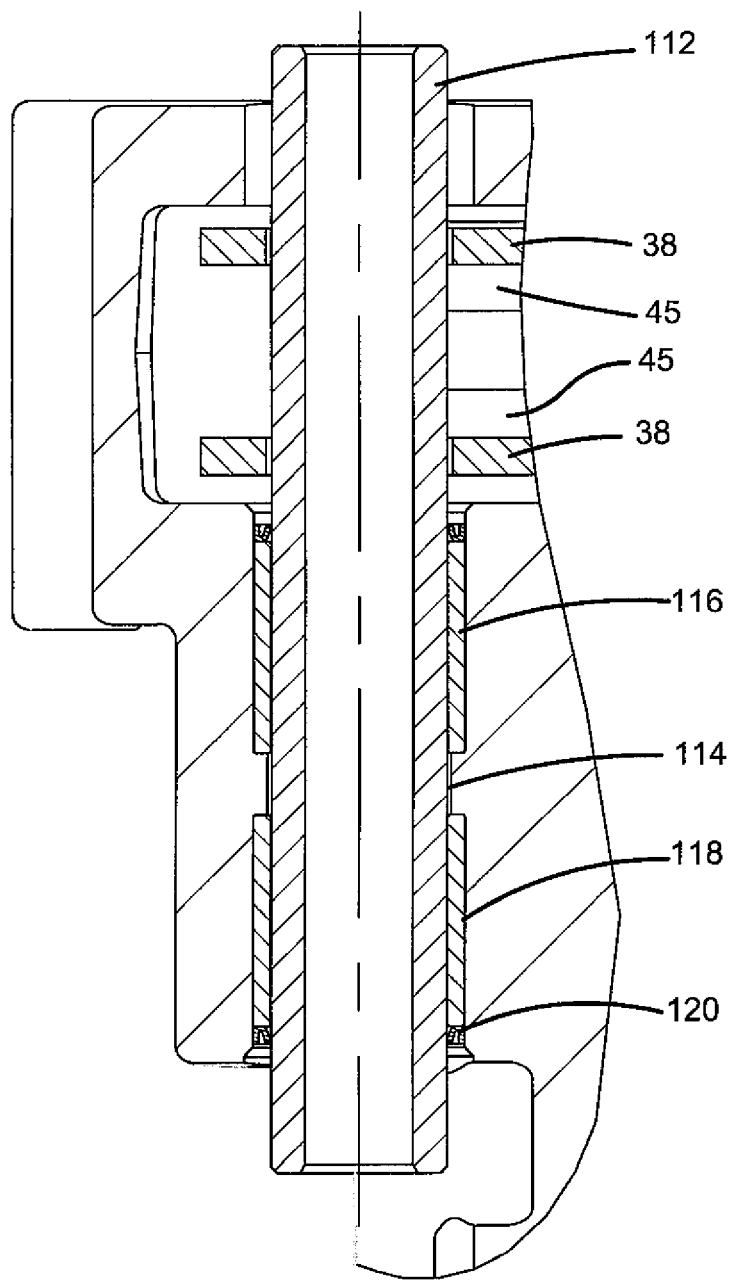
FIG. 6 is a sectional view of the caliper brake taken substantially along line 6-6 of FIG. 5.

PI piston 64 continues its travel into bore 70 and eventually the spring force of spring 108 causes ball 104 to be moved into a seated position. This seating of ball 104 blocks fluid communication at the position of ball 104, thereby trapping a column of fluid 105, as identified in FIG. 4, in the portion of fluid chamber 33 fluidly between SAHR piston 18 and PI piston 64. Thus, when additional hydraulic fluid enters hydraulic port 110, the continued travel of PI piston 64 causes projecting flange 78 to fluidly engage the portion of fluid chamber 33 fluidly between SAHR piston 18 and PI piston 64. This increases the pressure in that portion of fluid chamber 33. Eventually, the pressure is sufficient as to allow the SAHR piston 18 to overcome the spring force of spring assembly 20. Thus, SAHR piston 18 travels toward end cap 22 and the proximate or inboard stator plate 38 is no longer engaged by SAHR piston 18, thereby releasing the rotor.

To re-engage proximate or inboard stator plate 38 with SAHR piston 18, the hydraulic pressure of the hydraulic fluid behind the large end of PI piston 64 is released to "zero" and some or all of this fluid behind the large end of PI piston 64 returns to the source, such as a tank. Then, the spring force of spring assembly 66 causes PI piston 64 to travel toward, and to, end cap 68. During this movement, tip 102 engages ball 104 and compresses spring 108, thereby allowing the entirety of fluid chamber 33 to equalize at zero pressure. The spring force of spring assembly 20 then re-engages SAHR piston 18 with proximate or inboard stator plate 38 to re-impart the requisite force to the rotor.

Advantageously, for the next cycle of using brake 10, the use of the ball valve 106 allows for full replenishment of the fluid for column of fluid 105 in the portion of fluid chamber 33 fluidly between SAHR piston 18 and PI piston 64 when the fluid enters to start the next cycle. This is an improvement over certain prior art solutions that do not allow for easy replacement of fluid that has leaked from a column of fluid.

For use of caliper brake 10, brake 10 can be mounted to a mounting surface (not shown). Housing 11 has stator assembly 40 mounted in operative relation to the wheel rotor by a mounting bracket assembly. The mounting bracket assembly can be operatively joined to housing 11 by bolts (not shown) extending through sleeves 112, 114. To permit housing 11 to move axially of the bolts, the bolts may carry a sleeve 114. Housing 11 may carry a pair of spaced bushings 116 and 118 engaging sleeve 114 to facilitate the relative sliding movement. A lip seal 120 may be positioned at each axial extremity of each of the bushings 116, 118 to keep out foreign debris. One or more aspects of the mounting bracket assembly may be further described by the disclosure in U.S. Pat. No. 8,127,897 or U.S. Application Publication 2012/0325599, which are incorporated herein by reference.

In operation of caliper brake 10, hydraulic fluid is initiated into the portion of fluid chamber 33 between PI piston 64 and PI end cap 68. Hydraulic fluid fills the entirety of fluid chamber 33 because ball 104 is in an unseated position. Then, sufficient hydraulic fluid pressure is supplied to this portion of fluid chamber 33 between PI piston 64 and PI end cap 68 as to allow PI piston 64 to overcome the force opposing PI piston 64 and the spring force of associated spring assembly 66, thereby allowing PI piston 64 to travel in bore 70.

Once, PI piston 64 travels a sufficient distance, ball 104 of ball valve 106 will move to a seated position based on the opposing spring force of spring 108. This creates column of fluid 105 between PI piston 64 and SAHR piston 18. As PI piston 64 continues its travel, the pressure in this portion of fluid chamber 33 is increased such that the increased pressure now acting on SAHR piston 18 allows it to overcome the spring force of associated spring assembly 20. Thus, proximate or inboard stator plate 38 no longer engaged by SAHR piston 18, which thereby releases the rotor.

It should be appreciated that when PI piston 64 travels in bore 70, SAHR piston 18 will only move a fraction of the distance that PI piston 64 moves. This ratio of movement may be determined by the ratio of the effective area of the small diameter of PI piston 64 to the effective area of SAHR piston 18. The ratio of movement will correspond with the ratio of these effective areas. An effective area is defined as the area that is acted upon by pressure.

Using the equation Force=Pressure*Area, and assuming that friction drag is negligible, that the force from spring assembly 66 is unimportant for the purpose of demonstrating the pressure intensifying ratios or sizes, and that there is a maximum available hydraulic pressure, $P_{hydraulicmax}$, the piston diameters and therefore, the effective areas of the pistons, can be designed to overcome a predetermined spring clamp force, $F_{spring}$, of spring assembly 20.

Where the diameter of outer cylindrical surface 74 is $D_{PI,max}$, the force available behind PI piston 64 ($F_{PI}$) is equal to $\pi*((D_{PI,max}/2)^2)*P_{hydraulicmax}$. Then, where the diameter of projecting flange 78 is $D_{PI,min}$, the pressure in fluid chamber 33 ($P_{chamber}$) is equal to $F_{PI}/((D_{PI,min}/2)^2)$. Then, where the diameter of body portion 26 is $D_{SAHR,max}$, and where the diameter of projecting flange 32 is $D_{SAHR,min}$, the force available to be applied to SAHR piston 18 ($F_{SAHR}$) can be determined based on the effective area of SAHR piston 18 ($A_{SAHR}$).

The effective area of SAHR piston 18 can be determined from the diameter of body portion 26, $D_{SAHR,max}$, and the diameter of projecting flange 32, $D_{SAHR,min}$. The effective area of SAHR piston 18 ($A_{SAHR}$) is equal to $(\pi*(D_{SAHR,max}/2)^2)-(\pi*(D_{SAHR,min}/2)^2)$. Then, $A_{SAHR}$, can be used to find $F_{SAHR}$, by the equation $F_{SAHR}=A_{SAHR}*P_{chamber}$. To overcome a predetermined spring clamp force, $F_{spring}$, of spring assembly 20, the force of SAHR piston 18 ($F_{SAHR}$) must be greater than $F_{spring}$.

Caliper brake 10 can therefore be characterized by the sizes of the diameter of outer cylindrical surface 74, the diameter of projecting flange 78, the diameter of body portion 26, and the diameter of projecting flange 32. The diameter of outer cylindrical surface 74 may be in a range of from 1.5 inches to 3.0 inches. The diameter of projecting flange 78 may be in a range of from 0.5 inches to 1.0 inches. The diameter of body portion 26 may be in a range of from 3.0 inches to 5.0 inches. The diameter of projecting flange 32 may be in a range of from 1.5 inches to 4.0 inches.

The ratio of the diameter of outer cylindrical surface 74 to the diameter of projecting flange 78 can be said to cause the pressure intensification of PI assembly 14 based on the differing effective areas behind and in front of PI piston 64. This ratio can also be described as the intensifying factor. The ratio of the diameter of outer cylindrical surface 74 to the diameter of projecting flange 78 may be in a range of from 2:1 to 5:1.

Caliper brake 10 can also be characterized by the available hydraulic force and the predetermined spring clamp force of spring assembly 20. A hydraulic force available behind PI piston 64 ($F_{PI}$) may be in the range of from 100 psi to 300 psi. A predetermined spring clamp force, $F_{spring}$, of spring assembly 20 may be in the range of from 5,000 lbf to 10,000 lbf.

After SAHR piston 18 overcomes the predetermined spring clamp force of spring assembly 20 to disengage brake 10, brake 10 can be re-engaged when desired. Once the operator or other vehicle conditions requires that brake 10 be re-engaged, the pressure of the hydraulic fluid is allowed to release to "zero" such that spring assembly 66 associated with PI piston 64 moves PI piston 64 toward pin 98. Then, tip 102 engages ball 104 as to unseat ball 104. Thus, the pressure of column of fluid 105 is released, thereby causing SAHR piston 18 to re-engage proximate or inboard stator plate 38, thereby re-engaging the rotor.

As said above, for the next cycle of using brake 10, the use of ball valve 106 allows for a full replenishment of the column of fluid 105 in the portion of fluid chamber 33 fluidly between SAHR piston 18 and PI piston 64 to be replenished when the fluid enters to start the next cycle.

A caliper brake of the present invention may be used in the driveline of a rough terrain crane, but could be used in any suitable vehicle. The brake is particularly envisioned as being mounted to the input to the rear axle, though other suitable mounting locations are possible.

It is thus evident that a caliper brake constructed as described herein accomplishes the objects of the present invention and otherwise substantially improves the art.

What is claimed is:

1. A caliper brake adapted to act upon a stator to engage a rotor of a vehicle, the brake comprising a housing; a first piston assembly in said housing; a second piston assembly in said housing in fluid communication with said first piston assembly; said first piston assembly including a first piston and a spring assembly, said spring assembly urging said first piston into a first position engaging the stator; said second piston assembly including a second piston positionable in a first position when said first piston is in the first position, said second piston having a bore therethrough, said bore receiving a valve assembly including a spring and a ball, such that when said second piston moves from the first position to a second position the fluid acts upon said first piston thereby disengaging said first piston from the stator.

2. The caliper brake of claim 1, wherein said spring of said valve assembly urges said ball of said valve assembly into a closed position when said second piston is in said second position.

3. The caliper brake of claim 2, said housing including a pin assembly carrying a tip, said tip urging said ball into an open position when said second piston is in said first position.

4. The caliper brake of claim 1, said housing including a first stepped bore for receiving said first piston assembly and a second stepped bore for receiving said second piston assembly, said first stepped bore including a maximum diameter chamber, where an outer surface of said first piston is received in said maximum diameter chamber.

5. The caliper brake of claim 1, said first piston including a body portion and a projecting flange projecting from said body portion, said body portion of said first piston having an axial recess, said spring assembly being positioned in said axial recess.

6. The caliper brake of claim 5, wherein said projecting flange engages the stator when said first piston is in the first position.

7. A caliper brake adapted to act upon a stator to engage a rotor of a vehicle, the brake comprising a housing; a first piston assembly in said housing; a second piston assembly in said housing in fluid communication with said first piston assembly; said first piston assembly including a first piston and a spring assembly, said spring assembly urging said first piston into a first position engaging the stator; said second piston assembly including a second piston positionable in a first position when said first piston is in the first position, a second spring assembly urging said second piston to said first position, such that when said second piston moves from the first position to a second position the fluid acts upon said first piston thereby disengaging said first piston from the stator.

8. A caliper brake adapted to act upon a stator to engage a rotor of a vehicle, the brake comprising, a first piston assembly, a second piston assembly in fluid communication with said first piston assembly, said first piston assembly including a first piston and a spring assembly, said spring assembly urging said first piston into a first position engaging the stator, said second piston assembly including a second piston positionable in a first position when said first piston is in the first position, said second piston having a bore therethrough in fluid communication with said first piston, said bore receiving a source of fluid, a valve in said bore, said valve moving from a position wherein said bore is open to the source of fluid to a position closing said bore as said second piston moves from the first position to a second position such that the fluid acts upon said first piston thereby disengaging said first piston from the stator.

9. The caliper brake of claim 8, said valve including a spring and a ball, a pin acting on said ball to open said bore to the source of fluid.

10. The caliper brake of claim 9, said spring urging said ball toward a distal end of said second piston, wherein when said second piston is in said second position, said ball closes said bore from the source of fluid.

11. A method of moving a piston in a housing of a brake away from engagement with a stator comprising the steps of providing a second piston in the housing in fluid communication with the piston, and moving the second piston to provide a fluid force on the piston to move the piston away from the stator, wherein the step of moving the second piston includes the step of moving a valve in the second piston from an open position to a closed position.

12. The method of claim 11, wherein the piston and the second piston are in fluid communication by way of a fluid chamber, the method further comprising the step of sealing a portion of said fluid chamber.

13. The method of claim 11, wherein the step of moving the valve includes using a spring to urge a ball toward a distal end of the second piston.

* * * * *